(12) United States Patent
Von Poncet et al.

(10) Patent No.: US 7,002,760 B2
(45) Date of Patent: Feb. 21, 2006

(54) ADJUSTABLE CONVERGENCE DEVICE FOR A PROJECTOR AND PROJECTOR EQUIPPED WITH SUCH A CONVERGENCE DEVICE

(75) Inventors: Alexander Von Poncet, Schepdaal (BE); Bart Van den Bossche, Kuurne (BE)

(73) Assignee: Barco, Naamloze Vennootschap, Kortrijk (BE)

( * ) Notice: Subject to any disclaimer, the term of this patent is extended or adjusted under 35 U.S.C. 154(b) by 0 days.

(21) Appl. No.: 10/790,053

(22) Filed: Mar. 2, 2004

(65) Prior Publication Data

US 2005/0195504 A1    Sep. 8, 2005

(51) Int. Cl.
*G02B 1/03* (2006.01)
*G02B 7/02* (2006.01)

(52) U.S. Cl. ............... 359/822; 359/250; 359/634; 359/819

(58) Field of Classification Search ............... 359/822, 359/250, 634, 811, 819
See application file for complete search history.

(56) References Cited

U.S. PATENT DOCUMENTS 6,181,490 B1 * 1/2001 Wun et al. ............... 359/822

* cited by examiner

*Primary Examiner*—Timothy Thompson
(74) *Attorney, Agent, or Firm*—Bacon & Thomas PLLC

(57) ABSTRACT

An improved adjustable convergence device for adjusting the position of a pixel light modulator of a projector comprising at least two such light modulators mounted on the frame of the projector, said convergence device comprising a plate assembly which is fixed on said supporting frame and which supports the light modulator to be adjusted, wherein said plate assembly is composed of at least two plate elements, respectively a plate element which is fixed to the supporting frame and a plate element on which the light modulator is fixed, whereby these plate elements are connected to each other by means of at least one elastic joint and whereby at least first self-locking adjusting means are provided for transmitting a force in an adjusting direction between these plate elements in order to adjust the relative position between said plate elements.

23 Claims, 5 Drawing Sheets

ADJUSTABLE CONVERGENCE DEVICE FOR A PROJECTOR AND PROJECTOR EQUIPPED WITH SUCH A CONVERGENCE DEVICE

FIELD OF THE INVENTION

The present invention relates to a projector which is equipped with two or more pixel light modulators, such as DMD (digital mirror devices), LCOS, LCD or the like, whereby each light modulator generates a separate image with different colored light, usually red, green and blue light, and whereby these separate images are projected through a system of lenses and prisms onto a projection screen to form a superposed full color single image.

For good quality of the final image, it is essential that the separate light modulators are well aligned with respect to one another, generally in six degrees of freedom, namely three translations following the X, Y and Z directions of a rectangular coordinate system and the corresponding three rotations around these axes. The X and Y translations being situated in the plane of the concerned light modulator, and Z translation in the direction of the optical axis of the light modulator perpendicular to the plane of said modulator.

Rotation of a light modulator about the X- and Y-axes controls the sharpness of the image, whilst moving the light modulator in the Z-direction controls the magnification of the image, these combined movements allowing for a crisp image.

The other three degrees of freedom, namely the movements in the plane of the light modulator, which consists of a vertical and an horizontal translation together with the rotation in this plane, is used to obtain an image on the screen which is well positioned in the horizontal and in the vertical direction, as well as in the rotational direction. These degrees of freedom are used to align or converge the separately composed images from each of the light modulators on the screen, such that corresponding pixels of these images are perfectly matched, in this way avoiding loss of sharpness of the image and loss of correct colors, due to interference of overlapping adjacent pixels of the separate images.

The critical position of the modulators with respect to one another is adversely affected by changes in temperature and humidity, by unwanted vibrations during transport, and such.

The degrees of freedom controlling the convergence of the separate images on the screen, are highly sensitive to such changes. The remaining degrees of freedom controlling sharpness and magnification are less sensitive in this regard.

Convergence of the light modulators therefore at times requires readjustment to maintain alignment. A good quality projector typically requires convergence to within $\frac{1}{8}^{th}$ of a pixel.

An optimal cost/function relation is obtained by fixing the three degrees of freedom for sharpness and magnification in production of all modulators. One of the modulators is fixed and serves as the reference. Each remaining modulator is therefore adjustable in 3 degrees of freedom within their respective planes. This to allow for unwanted effects as described above. For a 3-modulator configuration this leads to a reduction in degrees of freedom from 3×6 degree of freedom to 2×3 degree of freedom.

The invention relates to a convergence device which allows for the accurate adjustment of the position of such a light modulator in its own plane, in order to adjust the convergence of the projected images.

BACKGROUND OF THE INVENTION

In known projectors a convergence device is used of the type comprising a plate on which a concerned light modulator is fixed, whereby this plate is slidably mounted on the frame of the projector and secured in place by means of a plurality of fixation screws.

An intervention to readjust the convergence requires loosening of these screws, slidably adjusting the position of the plate and tightening the screws again according to a predetermined sequence.

A disadvantage of this kind of convergence device is that tightening of these screws affects the alignment of the plate, therefore requiring up to eight iterations to fix the plate in the desired position. This requires patience and diligence of an experienced person with steady hands.

A complete operation for readjusting the convergence of such known projectors typically lasts thirty minutes and more.

Another disadvantage of present systems is that the light modulators are typically mounted with their edges forming an angle with the vertical. In order to shift the projected image in a vertical direction on the projection screen, the concerned light modulator has to be moved in an angled direction, making corrections even more difficult.

Another disadvantage is that access to the adjustment screws is often very difficult. This is further complicated by building projectors with an hermetically sealed housing. In such cases a correct intervention would require shipment to the lab to open the sealing in a controlled dustfree environment.

SUMMARY OF THE INVENTION

It is therefore an objective of the invention to provide an adjustable convergence device that allows for rectification of the convergence in a relatively short time, typically within a few minutes, allowing for very precise and accurate adjustments to be performed by a person with basic skills.

To this end the present invention provides for an improved adjustable convergence device for adjusting the position of a pixel light modulator of a projector comprising at least two such light modulators mounted on the frame of the projector, said convergence device comprising a plate assembly which is fixed on said supporting frame and which supports the light modulator to be adjusted, wherein said plate assembly is composed of at least two plate elements, respectively a plate element which is fixed to the supporting frame and a plate element on which the light modulator is being fixed, whereby these plate elements are connected to each other by means of at least one elastic joint and whereby at least first self-locking adjusting means are provided for transmitting a force in an adjusting direction between these plate elements in order to adjust the relative position between said plate elements.

The elastic joints between the plate elements eliminate any backlash between these elements.

The self-locking adjusting means have the advantage that subsequent adjustments in the adjustment directions do not influence previous adjustments, and do not require separate disturbing action for fixation of the obtained adjustment, resulting in only a few actions with a minimum number of iterations, therefore leading very quickly to the desired results.

Following a preferred embodiment the adjusting means comprise a plunger mechanism with a plunger block which is fixed to one plate element and which is provided with a passage directed following the adjustment direction of the concerned adjusting means and serving as a guide for a plunger which is slidably mounted in this passage, and which is in connection with the other plate element for pushing and/or pulling in the desired direction, the plunger mechanism further comprising a differential adjusting screw with two threaded parts, the two parts having a different pitch, one part cooperating with a threaded part of the passage in the plunger block, the other part cooperating with a threaded hole in the plunger.

Such a plunger mechanism used in conjunction with the plate assembly mentioned above is very well suited for the present application since it allows for very precise and accurate adjustments and is also self locking.

In particular the adjustment screws may have an elongated part with an extremity protruding from the housing through an hermetically sealed passage in said housing. An advantage is that the engine can be enclosed in an hermetically sealed housing and that adjustment of the convergence of the images is possible from outside, therefore nullifying dismantling of the enclosure.

Following a preferred embodiment the elongated parts of the adjusting screws are formed by a flexible tube such that the protruding extremities of these adjusting screws cab be directed in any given adjusting direction as to enhance accessibility.

Preferably the plate assembly of the improved adjustable convergence device is composed of at least three plate elements, respectively a first plate element which is fixed to the supporting frame, a second plate element on which the light modulator is being fixed, and a third intermediate plate element which is connected to each of the first and second plate elements by means of at least one elastic joint and whereby first adjusting means are provided for transmitting a force in a first adjusting direction between the first and the intermediate plate elements, and in turn a second adjusting means for transmitting a force in a second adjusting direction between the intermediate plate and the second plate element.

The plate elements and the elastic joints may be formed out of a single plate provided with grooves separating these plate elements and elastic joints in the form of bent arms, leaving a connection between the plate elements and the arms at the extremities of the arms, these connections serving as flexible pivots.

An advantage is the inherent simplicity of each adjustable convergence assembly providing for a simple to assemble, modular and compact unit containing amongst others the active and passive cooling elements, electronics and the light modulator.

The present invention also relates to a projector with at least two pixel light modulators and at least one adjustable convergence device with at least one adjusting means, whereby the adjusting means are accessible from the outside of the housing.

BRIEF DESCRIPTION OF THE DRAWINGS

With the intention of better showing the characteristics of the invention, hereafter, as an example without any limitative character, a preferred form of embodiment is described of an improved adjustable convergence device according to the invention for a projector and of a projector equipped with such an improved convergence device, with reference to the accompanying drawings, wherein.

DETAILED DESCRIPTION OF A PREFERRED EMBODIMENT

Figure 1:
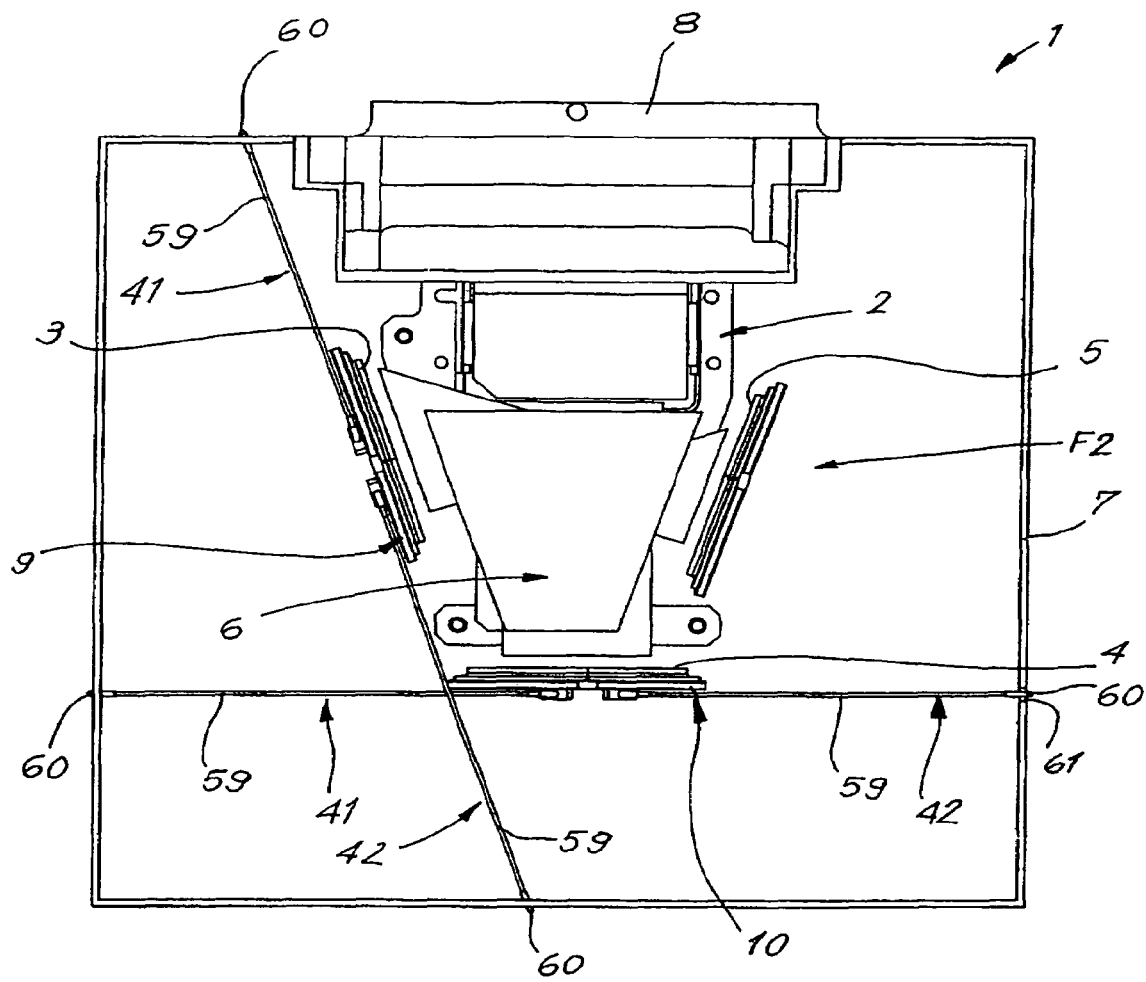
FIG. 1 schematically represents in a horizontal section the general structure of a projector equipped with an improved adjustable convergence device according to the invention.
Figure 2:
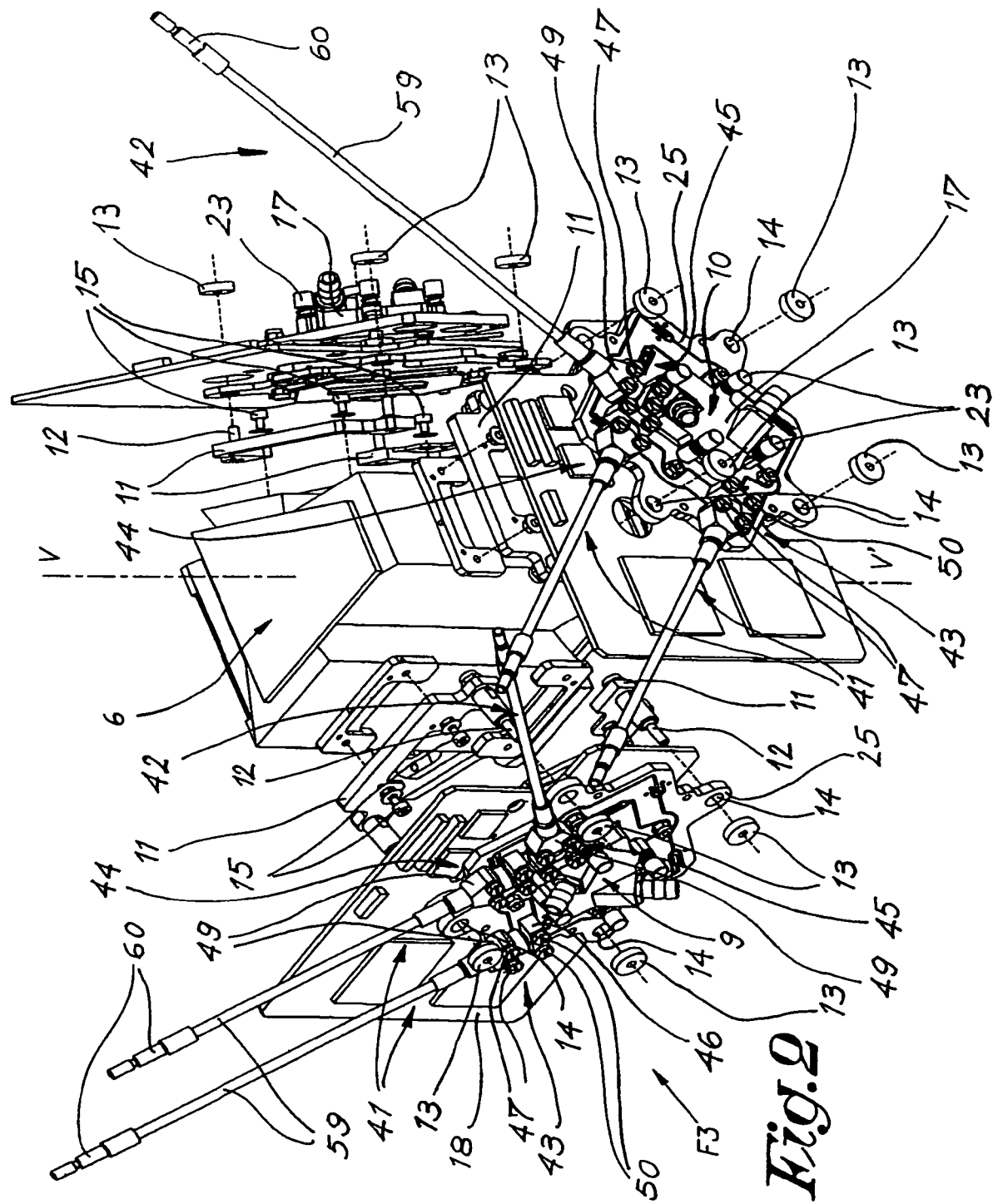
FIG. 2 is a more detailed perspective view of the adjustable convergence device indicated by F2 in FIG. 1.

The projector 1 represented in FIGS. 1 and 2 mainly comprises a so called engine consisting of a frame 2, three light modulators 3, 4 and 5 mounted on said frame 2; an optical system 6 composed of a plurality of lenses, prisms and the like, and electronic components which are not represented, which engine is enclosed in a housing 7, preferably an hermetically sealed housing 7, with a projection window 8.

The light modulators 3, 4, 5 are well known devices such as digital mirror devices (DMD), each of which are used to generate a digital image in a different color, for example a red, green and a blue image respectively, these being guided in a known manner through the optical system 6 and through the window 8 of the housing and projected in superposition on a projection screen which is not represented.

The light modulator 5, for example the blue light modulator, is in this case fixed to the frame, whilst each of the two other light modulators 3 and 4, for example the red and the green modulators, are mounted on an adjustable convergence device, respectively 9 and 10, according to the invention and allowing the very precise adjustment of the position of each concerned light modulator 3 and 4, in order to perfectly match the position of the superimposed images on the screen.

The convergence devices 9 and 10 are fixed on brackets 11 by means of gluing together pins 12 and glass washers 13, the pins 12 passing through holes 14, said brackets 11 being fixed on the frame 2 by means of screws 15.

Figure 3:
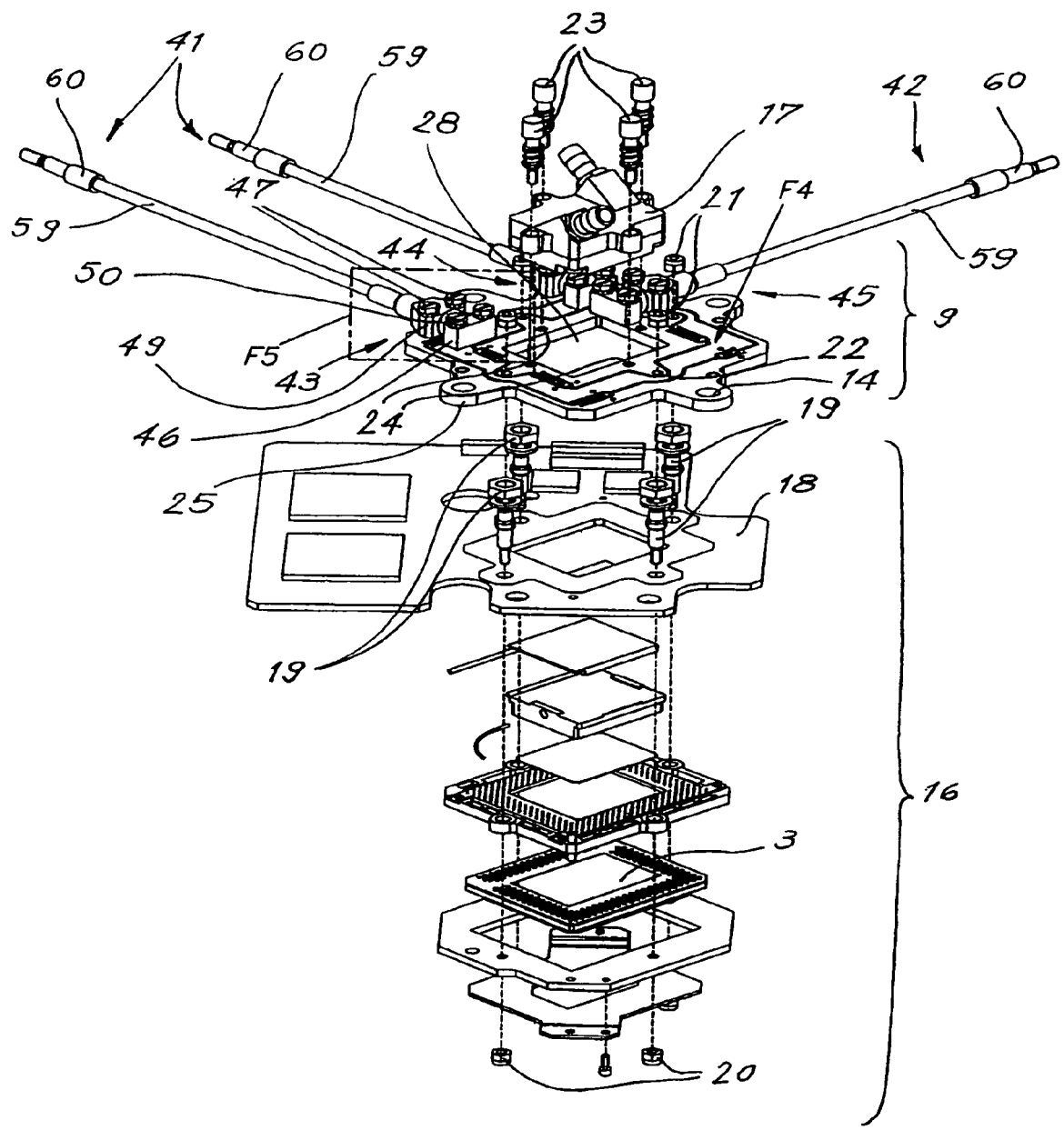
FIG. 3 is an exploded view of the part which is indicated by F3 in FIG. 2, but in a tilted position.

FIG. 3 represents an exploded view of an assembly of the adjustable convergence device 9, a light modulator assembly 16 and a cooling element 17 for the cooling of the modulator assembly 16.

The modulator assembly 16 is composed of a printed circuit board 18 on which the red light modulator 3 is attached together with a number of assembly parts which are not relevant for the present invention and which are therefore not further discussed hereafter and which are assembled by means of screws 19 and nuts 20.

Said modulator assembly 16 is fixed to the convergence device 9 by means of the screws 19 and nuts 21, the screws 19 passing through holes 22 in the convergence device 9, while the cooling element 17 is fixed to the convergence device 9 by means of screws 23 being screwed in threaded holes 24 of the convergence device 9.

The adjustable convergence device 9 comprises a plate assembly (shown more in detail in FIG. 4) and three coplanar plate elements, respectively a first outside plate element 25 with a central opening 26, a second inside plate element 27 centered in the opening 26 and also provided with a central opening 28 and an intermediate third plate element 29 holding the first and second plate elements 25 and 27 together by means of joints in the form of U-shaped arms 30 to 37 which are attached at each of their extremities to one of the concerned plate elements 25-27-29.

In the example shown, the plate elements 25, 27 and 29 and the arms 30 to 37 are formed out of a single plate provided with a plurality of grooves 38 separating these plate elements and the arms, leaving a material connection 39 between the extremities of the arms and the plate elements, such that these connections 39 can function as flexible hinges allowing the arms 30 to 37 to pivot without any back lash with regard to the plate element they are attached to.

In order to keep stresses of the connections 39 to a minimum, holes 40 may be drilled at the end of the outer grooves 38 surrounding the arms 30 to 37, in this way widening or diverging the grooves at their ends located at the connections 39 at the extremities of the arms.

Figure 4:
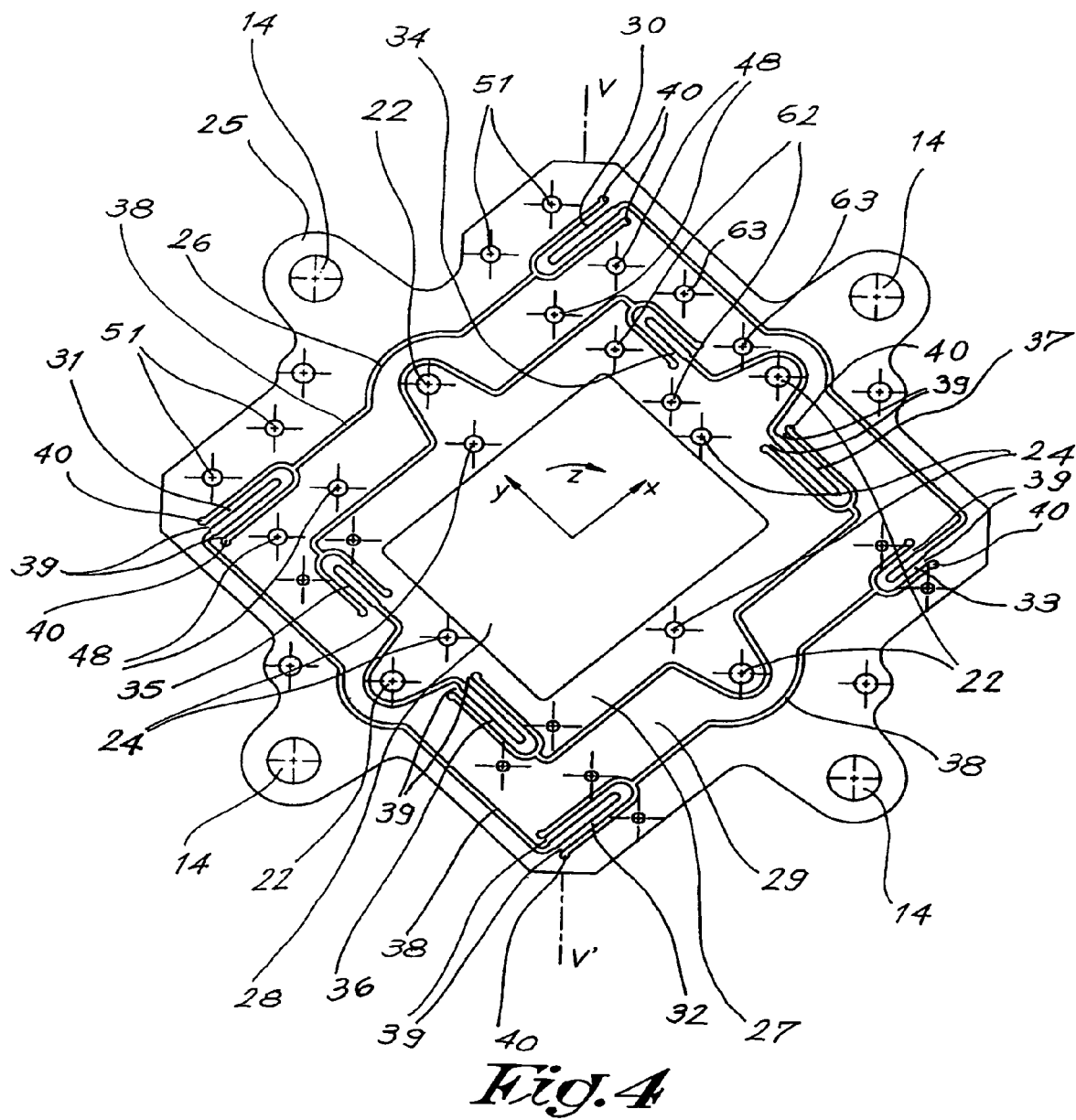
FIG. 4 is an elevated view on a larger scale of the part referred to as F4 in FIG. 3.

The four U-shaped arms 30 to 33 connecting the first plate element 25 to the intermediate plate element 29 are directed with their linear segments parallel to the longitudinal direction X of the light modulator 3 which can be fixed, as shown in FIG. 3, over the central opening 28 on the second plate element 27 with its longitudinal direction X and its transversal direction Y as indicated in FIG. 4.

These four arms 30 to 33 are disposed diagonally with respect to opening 28 covered by the light modulator 3 and comprise one arm 33 which is dimensioned to have stiffer linear segments than the remaining arms 30 to 32, for example because these linear segments are shorter. This to enhance the rotational capabilities of the adjustment.

The U-shaped arms 34 to 37 connecting the second plate element 27 to the intermediate plate element 29 are directed with their linear segments parallel to the transversal direction Y of the light modulator 3 and are also disposed diagonally with respect to a light modulator.

Amongst the arms 34 to 37, at least two arms, preferably the two arms 34 and 35 at opposite sides of the light modulator 3, are shorter than the other two arms 36 and 37. This to offset the asymmetric force application in the X-direction.

The first plate element 25 of the plate assembly supporting the light modulator 3 is fixed to the frame 2 of the projector 1, as shown in FIG. 2, whereby the plate assembly and the light modulator 3 are mounted forming an angle with the vertical direction V–V'. This to allow for x-y adjustments as seen on the screen.

The adjustable convergence device 9 further comprises first self-locking adjusting means 41 for transmitting a force in a first adjusting direction parallel to the transversal direction Y of the light modulator 3 between the first plate element 25 and the intermediate plate element 29 in order to adjust the relative position between said first and intermediate plate elements 25 and 29, as well as second self-locking adjusting means 42 for transmitting a force in a second adjusting direction parallel to the longitudinal direction X of the light modulator between the second plate element 27 and the intermediate plate element 29 in the relative position between said second and intermediate plate elements 27 and 29.

The first adjusting means 41 comprise two plunger mechanisms, respectively 43 and 44, directed in a parallel way to the first adjusting direction Y, while the second adjustment means 42 comprise one such plunger mechanism 45 directed in a parallel way to the second adjustment direction X.

Figure 5:
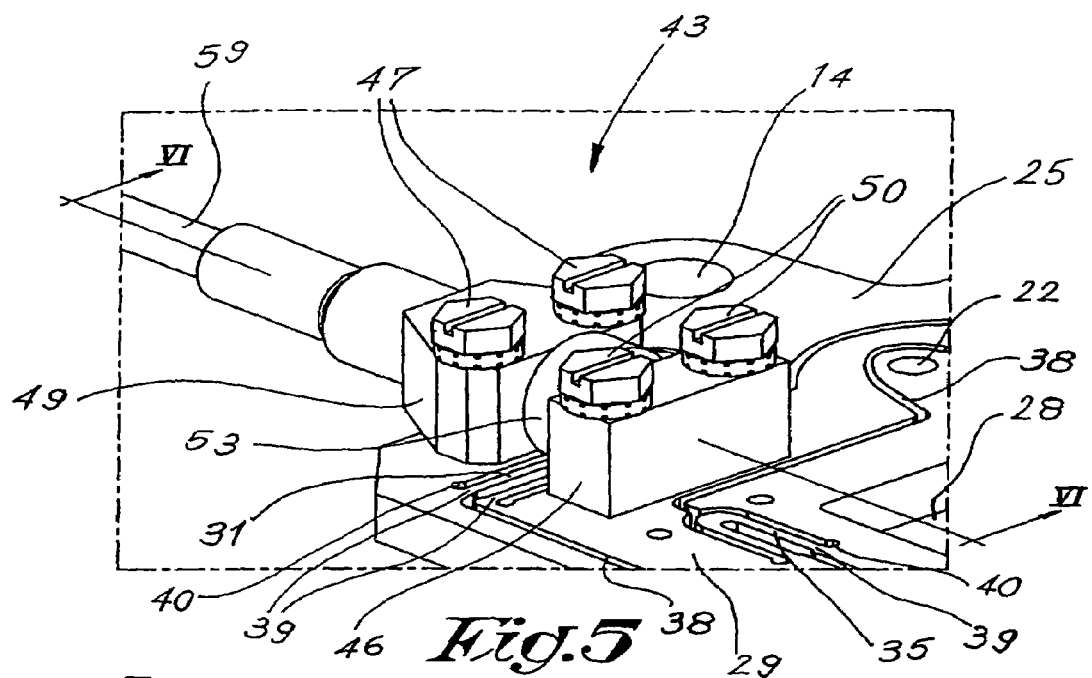
FIG. 5 represents on a larger scale a detailed view of the part within the rectangle F5 in FIG. 3.
Figure 6:
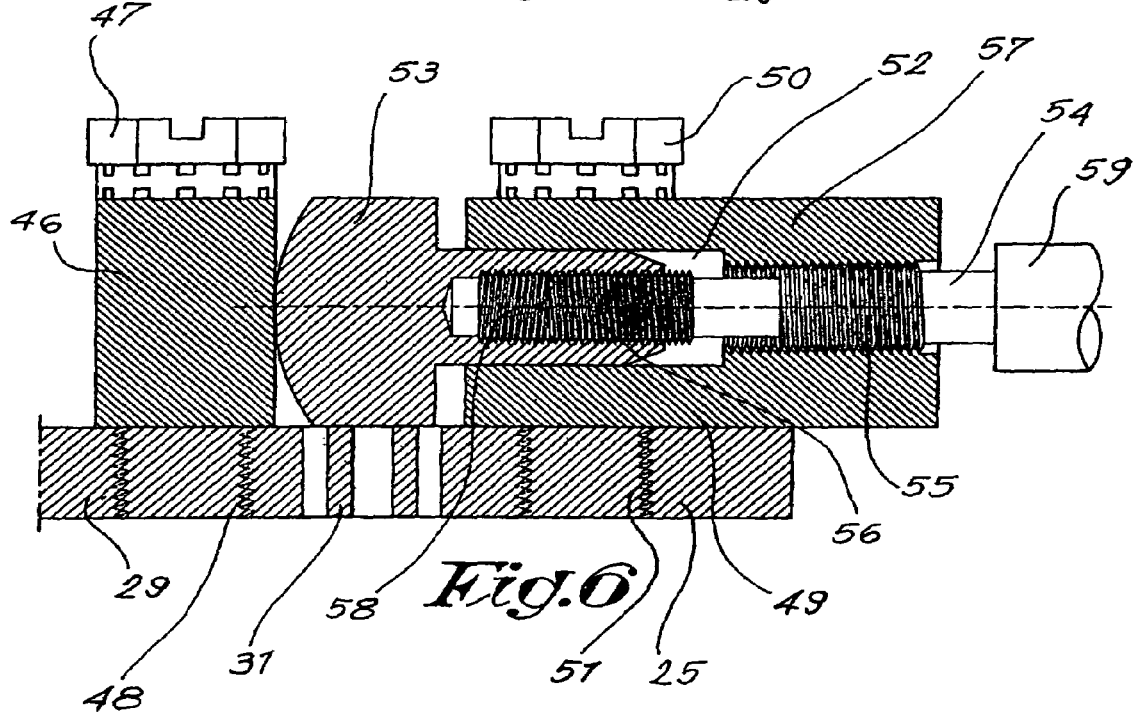
FIG. 6 is a cross section according to line VI—VI in FIG. 5.

As is represented in detail in FIGS. 5 and 6 for the plunger mechanism 43 as an example, each of the plunger mechanisms 43 and 44 comprise a stop 46 fixed on the intermediate plate element 29 by means of screws 47 engaging in threaded holes 48 of this plate element 29 and a plunger block 49 fixed to the first plate element 25 by means of screws 50 engaging in threaded holes 51 of the plate element 25, whereby the plunger block 49 is provided with a passage 52 directed following the adjustment direction Y and serving as a guide for a plunger 53 which is slidably mounted in this passage 52, facing said stop 46.

Said plunger mechanisms 43 and 44 also each comprise a differential adjusting screw 54 with two threaded parts, 55 and 56 respectively, the two parts 55 and 56 having a slightly different pitch, for example metric 4 and metric 5, one part 55 cooperating with a threaded part 57 of the passage 52 in the plunger block 49, the other part 56 cooperating with a threaded hole 58 in the plunger 53. The plunger has been so designed as to prevent it's rotation.

The adjusting screws 54 have an elongated part 59, preferably in the form of a flexible tube, with an extremity 60 protruding from the housing 7 through hermetically sealed passages 61 in said housing 7, allowing adjustment from outside the housing 7 of the projector 1.

The two plunger mechanisms 43 and 44 are spaced apart from each other and are each situated on a different side of the transverse symmetry axis of the light modulator 3 at the opposite side of the smaller arm 33.

The plunger mechanism 45 is in a similar way composed of a stop 46 which in this case is fixed on the second plate element 27 by means of screws 47 engaging in threaded holes 62 of said plate element 27 and a plunger 53 mounted in a plunger block 49 which is fixed to the intermediate plate element 29 with screws engaging in threaded holes 63 in said plate element 29 and being operated by a differential adjusting screw 54 with an elongated part 59 with a protruding extremity 60. Said plunger mechanism 45 is situated at a distance from the longitudinal symmetry axis of the light modulator 3.

The use of the adjustable convergence devices 9 and 10 according to the invention is easy and as follows.

When the engine is assembled, the convergence devices 9 and 10 are adjusted in such a way that images generated by the three light modulators 3, 4 and 5 which are projected through the optical system 6 and the window 8 on a screen are perfectly aligned with respect to one another.

The correct alignment of the images can change in time due to position drift of the light modulators 3, 4 and 5 as a result of variations in temperature and humidity or due to vibrations or other effects.

Therefore at times readjustment of the relative positions of the light modulators 3, 4 and 5 is required by using the adjustable convergence devices 9 and 10 for adjusting the convergence of the red and green images of the light modulators 3 and 4 with respect to each other and with respect to the blue image of the fixed light modulator 5, more precisely by operating the adjustment screws 54 of the respective plunger mechanisms 43, 44 and 45.

By turning the adjustments screw 54 of such a plunger mechanism 43-44-45, for example in clockwise direction, the adjustment screw 54 is further engaged in the plunger block 49, thereby moving in the direction of the stop 46 of the plunger mechanism 43-44-45, whilst in the same time the adjustment screw 54 is further engaged in the plunger 53, thereby retracting the plunger 53 in the opposite direction.

When the adjustment screw 54 is turned one turn, said-screw 54 moves over a distance equal to the pitch of the threaded part 57 of the passage 52 of the plunger block 49, whilst the plunger 53 is retracted over a distance equal to the pitch of the threaded hole 58 of the plunger 53. The resulting movement of the plunger 53 and hence of the stop 46 that is pushed by said plunger 53 is the difference between said pitches.

Very precise adjustments of the position of the plunger 53 are possible when choosing pitches that are only slightly different, allowing adjustment to a fraction of the dimensions of the pixels of the light modulators 3, 4 and 5, for instance adjustments easily up to $\frac{1}{8}^{th}$ of the dimensions of a 13 micrometer sized pixel.

The procedure for adjusting the position of light modulator 3 is as follows:

For adjusting the horizontal position of the projected image of the light modulator 3 on the projection screen, the adjusting screw 54 of the convergence device 45 has to be operated. By doing so, the plunger 53 is moved in the second adjustment direction X, thereby pushing away the stop 46 on the second plate element 27 against the action of the elastic joints 34 to 37. These elastic joints are dimensioned to compensate for the asymmetric action on the second plate element 27 in such a way that operating the adjustment screw 54 of the convergence device 45 results in a rectilinear movement of the second plate element 27 and of the light modulator 3 fixed thereupon, in said direction X.

Adjustments are directed in the X and Y direction of each respective modulator. This translates to X and Y adjustments on the screen, enhancing the intuitive nature of required corrections.

When assembling the engine, the convergence device 45 is mounted on the frame 2 with a certain precompression of the elastic joints, so that, when the adjustment screw 54 is unscrewed, the second plate element 27 and the light modulator 3 are moved in the opposite direction due to the releasing action of the compressed elastic joints 34 to 37. An advantage of this is that the forces exerted by the plunger 53 always act in the same way, thereby eliminating the influence of any back lash in the threaded parts 55-56-57-58 of the plunger mechanism 45.

Alternatively, instead of a unidirectional stop, a bi-directional coupling system could be used for pulling and/or pushing said stop, preferably also preloaded, and giving the possibility to doubling the actuation range.

For adjusting the vertical position of the projected image of the light modulator 3, the adjusting screws of both the plunger mechanisms 43 and 44 are equally turned, thereby moving the intermediate plate element 29 in the first adjusting direction Y.

Rotational adjustment of the image on the screen becomes possible by only operating the adjustment screw 54 of the plunger mechanism 43. By operating said screw 54 the intermediate plate element 29 and the light modulator 3 will rotate due to the asymmetric action of the plunger mechanism 43 on the intermediate plate element 29 and due to the fact that the elastic joint 33 is more rigid than the other three elastic joints 30 to 32, thereby serving as a pivot for the intermediate plate element 29.

The projected image of the light modulator 4 can be adjusted in a similar manner by operating the adjustment screws 54 of the convergence device 10.

It is clear that other arrangements of the elastic joints 30 to 37 and of the plunger mechanisms 43 to 45 are possible.

The elastic joints can for example be formed by arms which are bent in more complex forms with at least one bend and two or more linear segments.

The stop 46 of the plunger mechanisms 43 to 45 can be part of the plungers 53 allowing to push and pull with these plungers on the concerned plate elements.

It is possible to use a convergence device according to the invention, whereby only two plate elements are used and only one or two plunger mechanisms are acting in one direction. In this case the adjustment of the convergence could only be realized in one shift direction and/or in one rotational direction.

It is not necessary that the plate elements 25-27-29 and the arms 30 to 37 should be made out of the same plate, but that it would not be excluded to use separate parts for these elements.

In such cases elastic materials such as leaf springs or the like could be used as an elastic link between the separate plate elements.

Also it is not excluded that one of the plate element fixed to the frame 2 would be an integrated part of this frame 2.

It is also clear that each of the adjusting screws 54 could be actuated by means of or replaced by a motor, a piezo element or any other actuator, more specifically any other self-locking actuator bridging two plate elements.

Instead of plunger mechanisms 43-44-45 other actuators can be used, for example a linear motor, a hydraulically or pneumatically operated cylinder or the like.

The present invention is in no way limited to the form of embodiment described by way of an example and represented in the figures, however, such an improved adjustable convergence device according to the invention and such a projector equipped with such a convergence device, can be realized in various forms without leaving the scope of the invention.

What is claimed is:

1. An improved adjustable convergence device for adjusting the position of a pixel light modulator of a projector comprising at least two such light modulators mounted on the frame of the projector, said convergence device comprising a plate assembly which is fixed on said supporting frame and which supports the light modulator to be adjusted, wherein said plate assembly is composed of at least two plate elements, respectively a plate element which is fixed to the supporting frame and a plate element on which the light modulator is fixed, wherein these plate elements are connected to each other by means of at least one elastic joint and wherein at least a first self-locking adjuster is arranged for transmitting a force between these plate elements parallel to a plane of the modulator, in order to adjust the relative position between said plate elements.

2. The improved adjustable convergence device according to claim 1, wherein each of the adjusters comprises an actuator bridging the plate elements.

3. The improved adjustable convergence device according to claim 2, wherein each of the actuators is a plunger mechanism with a plunger block which is fixed to one plate element and which is provided with a passage directed following the adjustment direction of the concerned adjuster and serving as a guide for a plunger which is slidably mounted in this passage, and which is in connection with the other plate element.

4. The improved adjustable convergence device according to claim 3, wherein each of the actuators comprise a differential adjusting screw with two threaded parts, the two parts having a different pitch, one part cooperating with a threaded part of the passage in the plunger block, the other part cooperating with a threaded hole in the plunger or vice versa.

5. The improved adjustable convergence device according to claim 2, wherein the adjusters are formed by one actuator parallel or nearly parallel to the longitudinal or transverse symmetry axis of the light modulator.

6. The improved adjustable convergence device according to claim 5, wherein the actuator is located at a distance from the longitudinal or the transverse symmetry axis of the light modulator.

7. The improved adjustable convergence device according to claim 2, wherein the adjusters are formed by two actuators parallel or nearly parallel to the longitudinal or transverse symmetry axis of the light modulator and located on both sides of the particular axis and at a distance thereof.

8. The improved adjustable convergence device according to claim 4, wherein the engine composed of the frame and the light modulators is provided in a sealed housing and whereby each adjusting screw of the plunger mechanisms has an elongated part with an extremity protruding from the housing through an hermetically sealed passage in said housing.

9. The improved adjustable convergence device according to claim 8, wherein the elongated part is formed by a flexible tube.

10. The improved adjustable convergence device according to claim 1, wherein each of the elastic joints connecting the plate elements are formed by an arm which is pivotably attached at each of its extremities to each of the concerned plate elements.

11. The improved adjustable convergence device according to claim 10, wherein the arms of the elastic joints have a bent form, preferably a U-shaped form, with at least one bend and two linear segments.

12. The improved adjustable convergence device according to claim 11, wherein the linear segments of the arms are directed transversely to the adjusting direction, this to obtain intuitive adjustments on the screen.

13. The improved adjustable convergence device according to claim 12, wherein the plate elements are connected to each other by means of at least three arms, preferably four arms, with respect to the light modulator.

14. The improved adjustable convergence device according to claim 13, wherein at least one arm has stiffer linear segments than the other arms, this to enhance rotational capability.

15. The improved adjustable convergence device according to claim 13, wherein, amongst the U-shaped arms, at least two arms at opposite sides of the light modulator have shorter linear segments.

16. The improved adjustable convergence device according to claim 10, wherein the plate assembly is formed out of a single plate which is provided with grooves separating these plate elements and the arms of the plate assembly, leaving a connection between the plate elements and the arms at the extremities of the arms.

17. The improved adjustable convergence device according to claim 16, wherein the outer grooves surrounding the arms diverge at their ends located at the extremities of the arms.

18. The improved adjustable convergence device according to claim 1, wherein the plate assembly is composed of at least three plate elements, respectively a first plate element which is fixed to the supporting frame, a second plate element on which the light modulator is being fixed, and a third intermediate plate element which is connected to each of the first and second plate elements by means of at least one elastic joint and wherein a first self-locking adjuster is arranged for transmitting a force in a first adjusting direction between the first and the intermediate plate elements, and in turn a second self-locking adjuster is arranged for transmitting a force in a second adjusting direction between the intermediate and the second plate elements.

19. The improved adjustable convergence device according to claim 18, wherein the first and second adjusting directions are directed in the longitudinal and transverse directions of the light modulator.

20. The improved adjustable convergence device according to claim 18, wherein the elastic joints are formed by bent arms, whereby the linear segments of the arms connecting the first plate element to the intermediate element are directed transversely to the first adjusting direction, whilst the linear segments of the arms connecting the intermediate and second plate elements are directed transversely to the second adjusting direction.

21. A projector comprising a housing, at least two pixel light modulators and at least one adjustable convergence device with at least one self-locking adjuster arranged to transmit a force parallel to a plane of one of said light modules in order to adjust the relative position of said modulator, wherein the adjuster is accessible from the outside of the housing.

22. An engine comprising at least a frame, at least two light modulators and at least one adjustable convergence device with at least one self-locking adjuster arranged to transmit a force parallel to a plane of one of said light modules in order to adjust the relative position of said modulator.

23. The engine according to claim 22, wherein three light modulators are mounted on a frame and whereby one light modulator is fixed to the frame, while each other light modulator is fixed on an adjustable convergence device which is fixed to the frame.

* * * * *